United States Patent
Yuge

(10) Patent No.: US 10,703,633 B2
(45) Date of Patent: Jul. 7, 2020

(54) NANOCARBON COMPOSITE MATERIAL AND METHOD FOR MANUFACTURING SAME

(71) Applicant: NEC Corporation, Tokyo (JP)

(72) Inventor: Ryota Yuge, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 224 days.

(21) Appl. No.: 15/738,835

(22) PCT Filed: Jun. 17, 2016

(86) PCT No.: PCT/JP2016/002930
§ 371 (c)(1),
(2) Date: Dec. 21, 2017

(87) PCT Pub. No.: WO2016/208170
PCT Pub. Date: Dec. 29, 2016

(65) Prior Publication Data
US 2018/0162735 A1    Jun. 14, 2018

(30) Foreign Application Priority Data

Jun. 22, 2015 (JP) ................. 2015-124654

(51) Int. Cl.
*C01B 32/18* (2017.01)
*C08L 21/00* (2006.01)
(Continued)

(52) U.S. Cl.
CPC .............. *C01B 32/18* (2017.08); *C01B 32/05* (2017.08); *C08J 5/042* (2013.01); *C08K 3/044* (2017.05);
(Continued)

(58) Field of Classification Search
CPC . C01B 32/18; C01B 2202/36; C01B 2202/34; C01B 32/05; C01B 32/158;
(Continued)

(56) References Cited

U.S. PATENT DOCUMENTS 5,543,378 A    8/1996 Wang
2004/0241445 A1   12/2004 Yudasaka et al.
(Continued)

FOREIGN PATENT DOCUMENTS

JP    2003-025297 A    1/2003
JP    2003-146606 A    5/2003
(Continued)

OTHER PUBLICATIONS

Ali Izadi-Najafabadi et al., "High-Power Supercapacitor Electrodes from Single-Walled Carbon Nanohorn/Nanotube Composite," ACS Nano, Jan. 6, 2011, pp. 811-819, vol. 5, No. 2.
(Continued)

*Primary Examiner* — Daniel C. McCracken
(74) *Attorney, Agent, or Firm* — Sughrue Mion, PLLC

(57) ABSTRACT

[Problem]To provide a nanocarbon composite material that is superior in providing electrical conductivity.

[Solution]In a nanocarbon composite material 100 in an example embodiment of the present invention, a fibrous carbon nanohorn aggregate 11 of a plurality of single-walled carbon nanohorn aggregates connected fibrously is dispersively formed in a matrix 13.

10 Claims, 9 Drawing Sheets

(51) Int. Cl.
*C08L 101/00* (2006.01)
*C01B 32/05* (2017.01)
*C08K 3/04* (2006.01)
*C08J 5/04* (2006.01)

(52) U.S. Cl.
CPC ............ *C08L 21/00* (2013.01); *C08L 101/00* (2013.01); *C01B 2202/34* (2013.01); *C01B 2202/36* (2013.01); *C01P 2004/03* (2013.01); *C01P 2004/04* (2013.01); *C01P 2006/40* (2013.01)

(58) Field of Classification Search
CPC ..... C01B 32/159; C01B 32/16; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C08J 5/042; C08K 3/044; C08L 21/00; C08L 101/00; C01P 2006/40; C01P 2004/04; C01P 2004/03
See application file for complete search history.

(56) References Cited

U.S. PATENT DOCUMENTS

| | | | |
|---|---|---|---|
| 2005/0031525 | A1 | 2/2005 | Iijima et al. |
| 2006/0147647 | A1 | 7/2006 | Azami et al. |
| 2011/0003151 | A1 | 1/2011 | Nishio et al. |
| 2012/0202060 | A1* | 8/2012 | Yuge ...................... B82Y 30/00 428/367 |
| 2014/0329076 | A1* | 11/2014 | Goino ................... B82Y 30/00 428/304.4 |

FOREIGN PATENT DOCUMENTS

| | | |
|---|---|---|
| JP | 2003-313571 A | 11/2003 |
| JP | 3479889 B2 | 12/2003 |
| JP | 2004-016976 A | 1/2004 |
| JP | 3989256 B2 | 10/2007 |
| JP | 4234812 B2 | 3/2009 |
| JP | 2012-030979 A | 2/2012 |
| JP | 4873870 B2 | 2/2012 |
| JP | 2012-046864 A | 3/2012 |
| JP | 2012-079683 A | 4/2012 |
| JP | 5357047 B2 | 12/2013 |
| JP | 5384917 B2 | 1/2014 |
| WO | 2004/069744 A1 | 8/2004 |
| WO | 2011/046157 A1 | 4/2011 |
| WO | 2013/031958 A1 | 3/2013 |

OTHER PUBLICATIONS

Matti Knaapila et al., "Aligned Carbon Cones in Free-Standing UV-Curable Polymer Composite," Journal of Polymer Science: Part B: Polymer Physics, Jan. 3, 2011, pp. 399-403, vol. 49, No. 6.
International Search Report of PCT/JP2016/002930 dated Aug. 2, 2016.
Written Opinion of the International Searching Authority of PCT/JP2016/002930 dated Aug. 2, 2016.
Communication dated Feb. 26, 2019, from the European Patent Office in counterpart European Application No. 16813942.6.
Notice of Reasons for Refusal dated Jan. 7, 2020, issued by the Japanese Patent Office in Application No. 2017-524629.

* cited by examiner

Fig. 6

| | ELECTRICAL CONDUCTIVITY (Ω·cm) | TENSILE STRENGTH (MPa) |
|---|---|---|
| COMPOSITE MATERIAL 1A | $3.0 \times 10^2$ | 50 |
| COMPOSITE MATERIAL 2A | $8.0 \times 10^2$ | 40 |
| COMPOSITE MATERIAL 3A | $7.0 \times 10^3$ | 22 |
| COMPOSITE MATERIAL 4A | $9.0 \times 10^3$ | 18 |

Fig. 7

| | ELECTRICAL CONDUCTIVITY (Ω·cm) | TENSILE STRENGTH (MPa) |
|---|---|---|
| COMPOSITE MATERIAL 1B | $5.0 \times 10^2$ | 60 |
| COMPOSITE MATERIAL 2B | $2.0 \times 10^3$ | 45 |
| COMPOSITE MATERIAL 3B | $1.0 \times 10^4$ | 20 |
| COMPOSITE MATERIAL 4B | $3.0 \times 10^4$ | 15 |

Fig. 8

| | ELECTRICAL CONDUCTIVITY ($\Omega \cdot cm$) |
|---|---|
| PASTE 1C | $2.0 \times 10^{-5}$ |
| PASTE 2C | $3.0 \times 10^{-5}$ |
| PASTE 3C | $5.0 \times 10^{-5}$ |
| PASTE 4C | $8.0 \times 10^{-5}$ |

Fig. 9

| | THERMAL CONDUCTIVITY (W/mK) |
|---|---|
| COMPOSITE MATERIAL 1D | 330 |
| COMPOSITE MATERIAL 2D | 300 |
| COMPOSITE MATERIAL 3D | 260 |
| COMPOSITE MATERIAL 4D | 240 |

NANOCARBON COMPOSITE MATERIAL AND METHOD FOR MANUFACTURING SAME

CROSS REFERENCE TO RELATED APPLICATIONS

This application is a National Stage of International Application No. PCT/JP2016/002930 filed Jun. 17, 2016, claiming priority based on Japanese Patent Application No. 2015-124654 filed Jun. 22, 2015, the contents of all of which are incorporated herein by reference in their entirety.

TECHNICAL FIELD

The present invention relates to a nanocarbon composite material and the like, for example, to a material that includes carbon nanohorns.

BACKGROUND ART

A carbon material is generally and widely utilized as applications of a conductive material, a catalyst carrier, an absorbent, a separating medium, ink, tonner, and the like.

A nanocarbon material in nanometer size, such as a carbon nanotube and a carbon nanohorn aggregate, has come to attention in recent years with a focus on the characteristics as structures. Applications of a nanocarbon material have been intensively studied, as described in PTL 1 (carbon nanohorn), PTL 2 (drug delivery system (DDS)), PTL 3 (solid lubricant), PTL 4 (methane gas occlusion), PTL 5 (absorbent), PTL 6 (methane decomposition catalyst), PTL 7 (catalyst carrier), and PTL 8 (conducive material), for example.

In recent years, attempts have been made to provide functionalities, such as electrical conductivity, thermal conductivity, mechanical strength, electromagnetic shielding, and flame resistance, by adding a carbon nanotube to a matrix.

A technique described in PTL 9 disperses single-walled carbon nanotubes in an elastomer, thereby achieving high electrical conductivity and superior durability to repeated stress such as strain.

A technique described in PTL 10 adds a thermoplastic resin and organic modified layered silicate to a carbon nanotube, thereby achieving an electrically conductive thermoplastic resin and a plastic mold that exhibit superior electrical conductivity.

PTL 11 proposes a carbon nanohorn aggregate as a highly dispersive conductive material. According to a technique described in PTL 11, a superior conductive paste is implemented by mixing metal particles and a resin into a carbon nanohorn aggregate. The carbon nanohorn aggregate has a spherical structure on the order of 100 nm in which single-walled carbon nanohorns having a diameter of approximately 2 to 5 nm and a length of approximately 40 to 50 nm are radially assembled. Further, the carbon nanohorn aggregate differs from conventional spherical electrically conductive materials such as carbon black. A radial single-walled carbon nanohorn aggregate has many contacts with a matrix and has a characteristic of being easily entwined.

Further, there is a possibility that both of high electrical conductivity and high dispersibility may be achieved by mixing a highly dispersive spherical carbon nanohorn aggregate with a material having a needle-like structure with a large aspect ratio. In fact, efforts are being made to relax cohesion of carbon nanotubes to some extent and achieve high electrical conductivity by mixing single-walled carbon nanotubes and carbon nanohorn aggregates, according to a technique described in NPL 1.

CITATION LIST

Patent Literature

[PTL 1] Japanese Patent Publication No. 4234812
[PTL 2] Japanese Patent Publication No. 4873870
[PTL 3] Japanese Laid-open Patent Publication No. 2003-313571
[PTL 4] Japanese Laid-open Patent Publication No. 2004-16976
[PTL 5] Japanese Patent Publication No. 3989256
[PTL 6] Japanese Laid-open Patent Publication No. 2003-146606
[PTL 7] Japanese Patent Publication No. 3479889
[PTL 8] Japanese Patent Publication No. 5384917
[PTL 9] International Publication No. WO 2013/031958
[PTL 10] Japanese Patent Publication No. 5357047
[PTL 11] Japanese Laid-open Patent Publication No. 2012-079683

Non Patent Literature

[NPL 1] Izadi-Najafabadi A, Yamasa T, Futaba D N, Yudasaka M, Takagi H, Hatori H, et al. High-power supercapacitor electrodes from single-walled carbon nanohorn/nanotube composite. ACS Nano 2011, 5, 811-819

SUMMARY OF INVENTION

Technical Problem

However, a carbon nanotube has a problem of low dispersibility and, in addition, low affinity for other materials. Accordingly, when a resin, an elastomer, or the like is mixed with a carbon nanotube, a complex preprocessing process and the like are required in order to extract superior properties of a carbon nanotube, and thus manufacturing cost increases.

Further, a carbon nanohorn aggregate has superior dispersibility but has a spherical structure. Accordingly, there is a problem that it is difficult to obtain a good conductive path when a carbon nanohorn aggregate is used as a composite material, as compared with a needle-like structure which has a high aspect ratio, like a carbon nanotube. Specifically, since a carbon nanotube having a needle-like structure is capable of forming a conductive path on the order of micrometers, there is a great effect of providing electrical conductivity. In contrast, a carbon nanohorn aggregate having a spherical structure cannot form a long conductive path like a carbon material having a needle-like structure.

It is also known that excellent electrical conductivity and the like are exhibited by mixing a highly dispersive spherical carbon nanohorn aggregate with a material having a needle-like structure. However, since these materials are usually manufactured separately, a process of mixing the materials is required, thus increasing a cost.

In addition, there is a problem that electrical conductivity is not sufficiently improved by mixing carbon nanotubes, carbon fibers, and the like since there are few contacts between an interface of a needle-like structure and a carbon nanohorn aggregate.

The present invention has been made in light of these circumstances, and an object of the present invention is to provide a nanocarbon composite material and the like that are superior in providing electrical conductivity. Another object of the present invention is to provide a nanocarbon composite material and the like that are superior in providing thermal conductivity and mechanical strength, in addition to providing electrical conductivity.

Solution to Problem

In a nanocarbon composite material according to the present invention, a fibrous carbon nanohorn aggregate of single-walled carbon nanohorn aggregates connected fibrously is dispersively formed in a matrix.

A method for manufacturing a nanocarbon composite material according to the present invention includes an atmosphere setting step of setting an atmosphere of inert gas, nitrogen gas, or mixture thereof in a chamber in which a catalyst-containing carbon target is placed, an evaporation step of evaporating the catalyst-containing carbon target by laser ablation while rotating the catalyst-containing carbon target, a gas-flow-rate control step of controlling a gas flow rate to be constant in a process of evaporation of the catalyst-containing carbon target, and a mixing step of mixing, into a matrix, a fibrous carbon nanohorn aggregate of a plurality of single-walled carbon nanohorns connected fibrously, which is obtained through a process including the atmosphere setting step, the evaporation step, and the gas-flow-rate control step.

Advantageous Effects of Invention

According to the nanocarbon composite material and the like of the present invention, a nanocarbon composite material and the like that are superior in providing electrical conductivity can be provided.

BRIEF DESCRIPTION OF DRAWINGS

FIG. 6 is a diagram illustrating electrical conductivity and tensile strength of a nanocarbon composite material in an example embodiment of the present invention and comparative examples;

FIG. 7 is a diagram illustrating electrical conductivity and tensile strength of a nanocarbon composite material in an example embodiment of the present invention and comparative examples;

FIG. 8 is a diagram illustrating electrical conductivity of a conductive paste made of a nanocarbon composite material in an example embodiment of the present invention and comparative examples; and FIG. 9 is a diagram illustrating thermal conductivity of a nanocarbon composite material in an example embodiment of the present invention and comparative examples.

DESCRIPTION OF EMBODIMENTS

Example Embodiments

The present inventors have intensively conducted a study on carbon nanohorn aggregates that exhibit high electrical conductivity and thus have found a fibrous carbon nanohorn aggregate that is superior in providing electrical conductivity (Japanese Patent Application No. 2015-52185).

The present inventors have also found that the fibrous carbon nanohorn aggregate can be formed concurrently with a spherical carbon nanohorn aggregate which is superior in dispersibility.

Further, since both of the fibrous carbon nanohorn aggregate and the spherical carbon nanohorn aggregate have a radial structure, the fibrous carbon nanohorn aggregate and the spherical carbon nanohorn aggregate have many contacts at an interface and firmly stick to each other and to a matrix as well.

The inventor has also found that the fibrous carbon nanohorn aggregate has higher dispersibility than other carbon materials that have a needle-like structure.

Consequently, the present inventor has found that a nanocarbon composite material that has high electrical conductivity and thermal conductivity and is superior in mechanical strength, durability and the like can be produced by dispersing a high proportion of (highly dispersing) fibrous and spherical carbon nanohorn aggregates in a matrix.

A configuration of a nanocarbon composite material 100 in an example embodiment of the present invention will be described.

Figure 1:
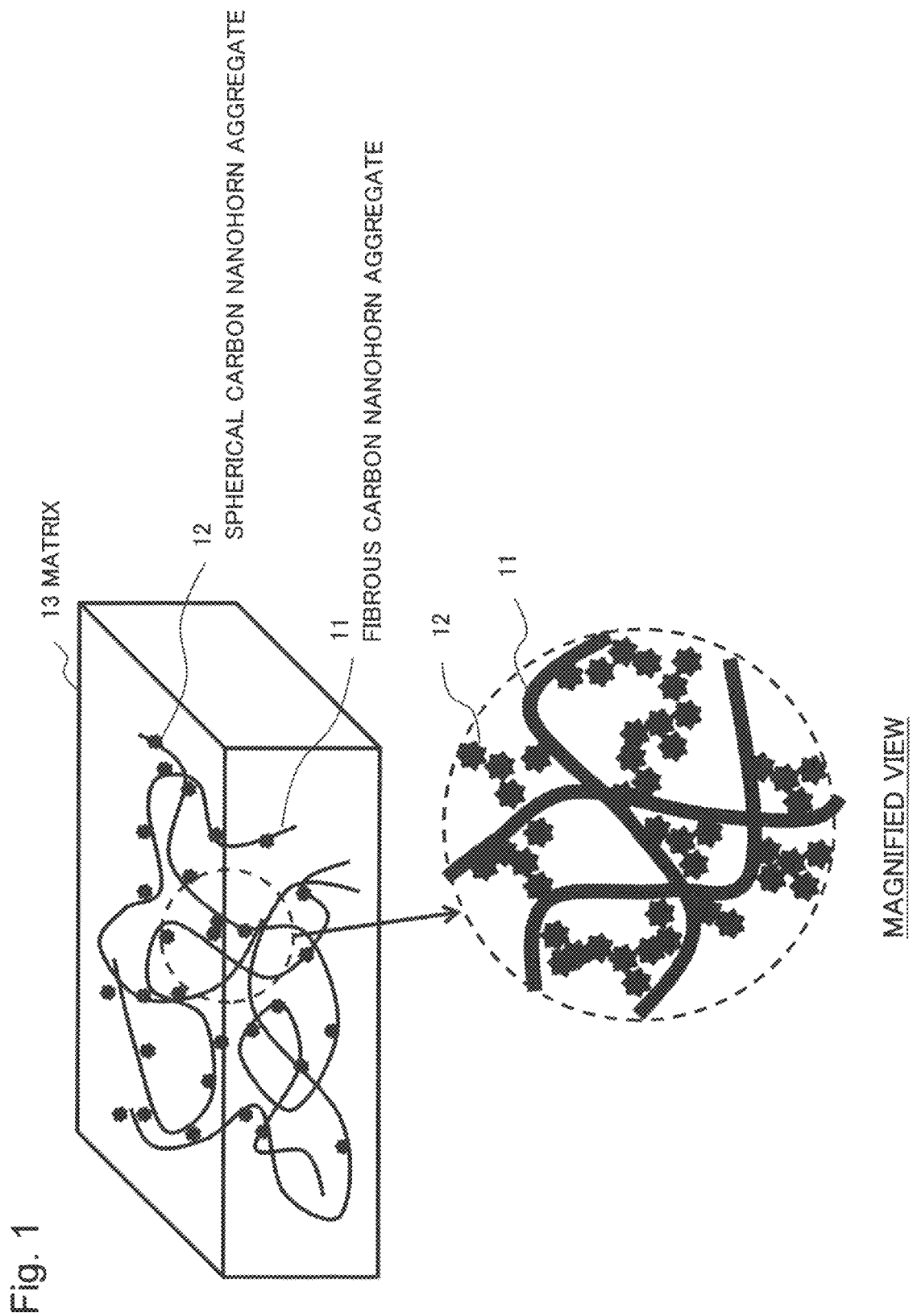
FIG. 1 is a perspective view schematically illustrating a configuration of a nanocarbon composite material in an example embodiment of the present invention.

FIG. 1 is a perspective view schematically illustrating a configuration of the nanocarbon composite material 100.

As illustrated in FIG. 1, the nanocarbon composite material 100 includes fibrous carbon nanohorn aggregates 11, spherical carbon nanohorn aggregates 12, and a matrix 13.

As illustrated in FIG. 1, the fibrous carbon nanohorn aggregates 11 are dispersed in the matrix 13. Each of the fibrous carbon nanohorn aggregates 11 is formed from a plurality of single-walled carbon nanohorns connected fibrously. In other words, each of the fibrous carbon nanohorn aggregates 11 is formed from a plurality of single-walled carbon nanohorns fibrously assembled together. A single-walled carbon nanohorn here has a conical shape in which one end of the cylindrical single-walled carbon nanotube is pointed like a horn, and is composed primarily of carbon atomic planes having a graphite structure like a carbon nanotube. Note that each of the single-walled carbon nanohorns that constitute the fibrous carbon nanohorn aggregate 11 is the same as each of single-walled carbon nanohorns that constitute the spherical carbon nanohorn aggregate 12. In both of the spherical carbon nanohorn aggregate 12 and the fibrous carbon nanohorn aggregate 11, the single-walled carbon nanohorns are radially assembled with their horns pointing outward. In particular, in the fibrous carbon nanohorn aggregate 11, the single-walled carbon nanohorns are connected fibrously in a one-dimensional direction while being radially assembled with an end pointing outward. In this case, the fibrous carbon nanohorn aggregates 11 are formed of carbon nanohorn aggregates of at least one type among a seed-type assembly structure, a bud-type assembly structure, a dahlia-type assembly structure, a petal-dahlia-type (where petals and dahlias are mixed) assembly structure, and a petal-type (a structure with several graphene sheets) assembly structure. Note that assembly structures such as the seed-type assembly structure, the bud-type assembly structure, the dahlia-type assembly structure, the petal-dahlia-type (where petals and dahlias are mixed), and the petal-type (structure with several graphene sheets) assembly structure will be described later in detail.

Because of the presence of the spherical carbon nanohorn aggregates 12, the fibrous carbon nanohorn aggregates 11 do not cohere but instead are dispersed even in the matrix 13. Further, since the fibrous carbon nanohorn aggregates 11 are produced by evaporating a target that uses a catalyst metal, the catalyst metal exists inside the fibrous carbon nanohorn aggregates 11.

As illustrated in FIG. 1, the spherical carbon nanohorn aggregates 12 are dispersed in the matrix 13. Each of the spherical carbon nanohorn aggregates 12 is formed from a plurality of single-walled carbon nanohorns assembled spherically. Note that each of the single-walled carbon nanohorns that constitute the spherical carbon nanohorn aggregate 12 is the same as each of single-walled carbon nanohorns that constitute the fibrous carbon nanohorn aggregate 11. The spherical carbon nanohorn aggregates 12 are highly dispersed in the matrix 13 and stick to the fibrous carbon nanohorn aggregates 11 which have a large aspect ratio. This increases the number of conductive paths in the nanocarbon composite material 100. Further, since the spherical carbon nanohorn aggregates 12 are produced by evaporating a target that uses a catalyst metal, the catalyst metal mostly exists inside the spherical carbon nanohorn aggregates 12.

As illustrated in FIG. 1, the fibrous carbon nanohorn aggregates 11 and the spherical carbon nanohorn aggregates 12 are dispersed in the matrix 13. Note that since the fibrous carbon nanohorn aggregates 11 and the spherical carbon nanohorn aggregates 12 are highly dispersive, the fibrous carbon nanohorn aggregates 11 and the spherical carbon nanohorn aggregates 12 can be dispersed in the matrix 13 without a dispersant. The matrix 13 is made of any one or more of a metal, an oxide, a conductive polymer compound, a resin, and an elastomer. An end of each individual single-walled carbon nanohorn of both of the fibrous carbon nanohorn aggregates 11 and the spherical carbon nanohorn aggregates 12 points outward as described above.

Accordingly, both of the fibrous carbon nanohorn aggregates 11 and the spherical carbon nanohorn aggregates 12 have many contacts with each other and therefore have high adhesiveness, high resistance to structural transformation and high durability. In addition, fibrous and spherical products in the fibrous carbon nanohorn aggregates 11 and the spherical carbon nanohorn aggregates 12 are concurrently generated and exist in a mixed form. Accordingly, a structure is produced in which fibrous products are less likely to cohere.

Note that the fibrous carbon nanohorn aggregates 11 and the spherical carbon nanohorn aggregates 12 may be separated by using a centrifugal separation method, filtration using a filter, a difference in settling velocity after dispersion in a solvent, gel permeation chromatography or the like. However, preferably, the fibrous carbon nanohorn aggregates 11 and the spherical carbon nanohorn aggregates 12 are directly used without separation in order to maintain high dispersibility of the fibrous carbon nanohorn aggregate 11.

Note that the fibrous carbon nanohorn aggregates 11 and the spherical carbon nanohorn aggregates 12 will be sometimes simply collectively referred to as carbon nanohorn aggregates in the following description.

Each single-walled carbon nanohorn of the fibrous carbon nanohorn aggregates 11 and the spherical carbon nanohorn aggregates 12 produced by the inventors has a diameter of approximately 1 nm to 5 nm and a length of approximately 30 nm to 100 nm. The fibrous carbon nanohorn aggregates 11 can have a diameter of approximately 30 nm to 200 nm and a length of approximately 1 μm to 100 μnm. On the other hand, the spherical carbon nanohorn aggregates 12 have a diameter of approximately 30 nm to 200 nm and have a substantially uniform size.

Carbon nanohorn aggregates of a seed type, a bud type, dahlia type, a petal-dahlia type, and a petal type, alone or in any combination, are formed.

The seed type has a shape in which there are few or no horn-shaped protrusions on a spherical surface. The bud type has a shape in which there are some horn-shaped protrusions on a spherical surface. The dahlia type has a shape in which there are many horn-shaped protrusions on a spherical surface. The petal type has a shape in which there are petal-like protrusions on a spherical surface. The petal-dahlia type has an intermediate structure between the dahlia type and the petal type.

The fibrous carbon nanohorn aggregates 11 are generated in a state in which they are mixed with the spherical carbon nanohorn aggregates 12. A form (particle diameter, etc.) of the spherical carbon nanohorn aggregates 12 can be adjusted according to production conditions and specifically, is changed depending on laser output, the type and flow rate of gas.

Minute holes can be provided (opened) in the fibrous carbon nanohorn aggregates 11 or the spherical carbon nanohorn aggregates 12 by an oxidation process. By the oxidization process, defects such as five-membered rings and seven-membered rings are oxidized. As a result, portions, such as side surfaces and ends, which have five-membered rings and seven-membered rings, are opened. By the oxidation process, surface functional groups containing oxygen are formed in the openings. A gas phase process and a liquid phase process can be used for the oxidation process. In the case of the gas phase process, air, oxygen or carbon monoxide can be used as an atmosphere gas and air is suitable in terms of cost. Temperature during the oxidation process can be in the range of 300 to 650° C. and is more suitable in the range of 400 to 550° C. When the oxidation process is performed at a temperature equal to or higher than 300° C., there is no concern that little carbon burns and openings cannot be made. When the oxidation process is performed at a temperature equal to or lower than 650° C., burning of the whole carbon nanohorn aggregates can be prevented. In the case of the liquid phase process, the oxidation process can be performed by using nitric acid, sulfuric acid, hydrogen peroxide or the like. In the case where nitric acid is used, the nitric acid can be used in a temperature range from room temperature to 120° C. A temperature of 120° C. or lower in the oxidation process prevents oxidizing power of nitric acid from becoming excessively high. Accordingly, in this case, the fibrous carbon nanohorn aggregates 11 or the spherical carbon nanohorn aggregates 12 are not excessively oxidized. In the case where hydrogen peroxide is used, the hydrogen peroxide can be used in a temperature range from room temperature to 100° C. More preferably, hydrogen peroxide can be used in a temperature range between 40° C., inclusive, and 100° C., inclusive. When the oxidation process is performed at 40° C. or higher, the oxidizing power of hydrogen peroxide efficiently works on the fibrous carbon nanohorn aggregates 11 or the spherical carbon nanohorn aggregates 12 and therefore openings can be efficiently made. In the case of the liquid phase process, it is more effective to use light irradiation in combination.

A catalyst (metal) contained during generation of the fibrous carbon nanohorn aggregates 11 or the spherical carbon nanohorn aggregates 12 dissolves in nitric acid, sulfuric acid or hydrochloric acid and therefore can be removed. Hydrochloric acid is suitable from the viewpoint of ease of use. A temperature for dissolving the catalyst can be chosen as appropriate. However, in order to adequately remove the catalyst, it is desirable that the fibrous carbon nanohorn aggregates 11 or the spherical carbon nanohorn aggregates 12 be heated to a temperature equal to or higher than 70° C. for performing the oxidation process. Further, since the catalyst can possibly be covered with a carbon film during generation of carbon nanohorn aggregates, preprocessing for removing the carbon film is desirably performed. In the preprocessing, desirably the carbon nanohorn aggregates 11 or the spherical carbon nanohorn aggregates 12 are heated in air at a temperature of approximately 250 to 450° C.

The fibrous carbon nanohorn aggregates 11 or the spherical carbon nanohorn aggregates 12 to be obtained can be improved in crystallinity by heat treatment in an inert gas, hydrogen or a vacuum. While heat treatment temperature may be 800° C. to 2000° C., using a temperature of 1000° C. to 1500° C. is more preferable. Further, surface functional groups formed by the oxidation process for forming openings also can be removed by the heat treatment. The heat treatment temperature for the removal may be 150° C. to 2000° C. In order to remove C—O, C=O, and —OH bonds in carboxyl groups, hydroxyl groups or the like as surface functional groups, the heat treatment temperature is desirably in the range of 150° C. to 600° C. The heat treatment performed at a temperature equal to or higher than 600° C. is desirable for the removal of C=O bonds in carbonyl groups or the like as surface functional groups. Surface functional groups can also be removed by reduction. The reduction can be performed in a gaseous atmosphere of hydrogen or the like or in a liquid atmosphere of hydrazine or the like.

From the viewpoint of durability and electrical conductivity, a mixture quantity of the fibrous carbon nanohorn aggregates 11 and the spherical carbon nanohorn aggregates 12 dispersed in the matrix 13 is not less than 0.001 mass % and not more than 60 mass %, more preferably not less than 0.05 mass % and not more than 50 mass %, where the mass of the whole nanocarbon composite material 100 is set to 100 mass %. The ratio between the fibrous carbon nanohorn aggregates 11 and the spherical carbon nanohorn aggregates 12 can be adjusted as appropriate.

Percentage of the fibrous carbon nanohorn aggregates 11 is preferably not less than 5 mass % and not more than 80 mass %, and more preferably not less than 10 mass % and not more than 70 mass %.

As described previously, the matrix 13 is made of one or more of a metal, an oxide, a conductive polymer compound, a resin, and an elastomer. Material of the matrix 13 can be chosen as appropriate according to physical properties, such as electrical conductivity, durability, elasticity, mechanical strength, electromagnetic shielding, and flame resistance, which are required of the nanocarbon composite material 100.

In the case where the matrix 13 used in the nanocarbon composite material 100 is a metal, a noble metal such as gold (Au), silver (Ag), platinum (Pt), palladium (Pd), rhodium (Rh), iridium (Ir), ruthenium (Ru), or osmium (Os), or copper (Cu), aluminum (Al), tin (Sn) or the like, for example, can be used as the matrix 13 from the viewpoint of electrical conductivity, durability, corrosion resistance, and thermal conductivity.

In the case where a combination of two or more metals is used as the matrix 13, an alloy composition such as Sn—Ag, Sn—Cu, Sn—Ag—Cu, Sn—Pb, or Al—Si, for example, can be used as the matrix 13.

In the case where the matrix 13 is an oxide, Zr oxide, Al oxide, Ti oxide, V oxide, indium tin oxide (ITO) or the like, for example, is preferably used as the matrix 13, although other oxide may be chosen as appropriate.

In the case where the matrix 13 used in the nanocarbon composite material 100 is a conductive polymer compound, a polythiophene system, a polyacetylene system, a polyaniline system, or a polypyrrole system, for example, can be used as the matrix 13.

In the case where the matrix 13 used in the nanocarbon composite material 100 is an elastomer, one or more elastomers selected from among nitrile rubber, chloroprene rubber, chlorosulfonated polyethylene, urethane rubber, acrylic rubber, fluoro rubber, styrene-butadiene rubber, and silicon rubber, for example, can be used as the matrix 13.

In the case where the matrix 13 used in the nanocarbon composite material 100 is a resin, one or more resins selected from among an epoxy-based resin, a polystyrene-based resin, a silicone-based resin, an acryl-based resin, a chloroprene-based resin, a polysulfide-based resin, a polyurethane-based resin, a polyisobutyl-based resin, a phlorosilicone-based resin, a polycarbonate-based resin, a polyester-based resin, a polyethylene-based resin and a polyamide-based resin, for example, can be used as the matrix 13.

Figure 2:
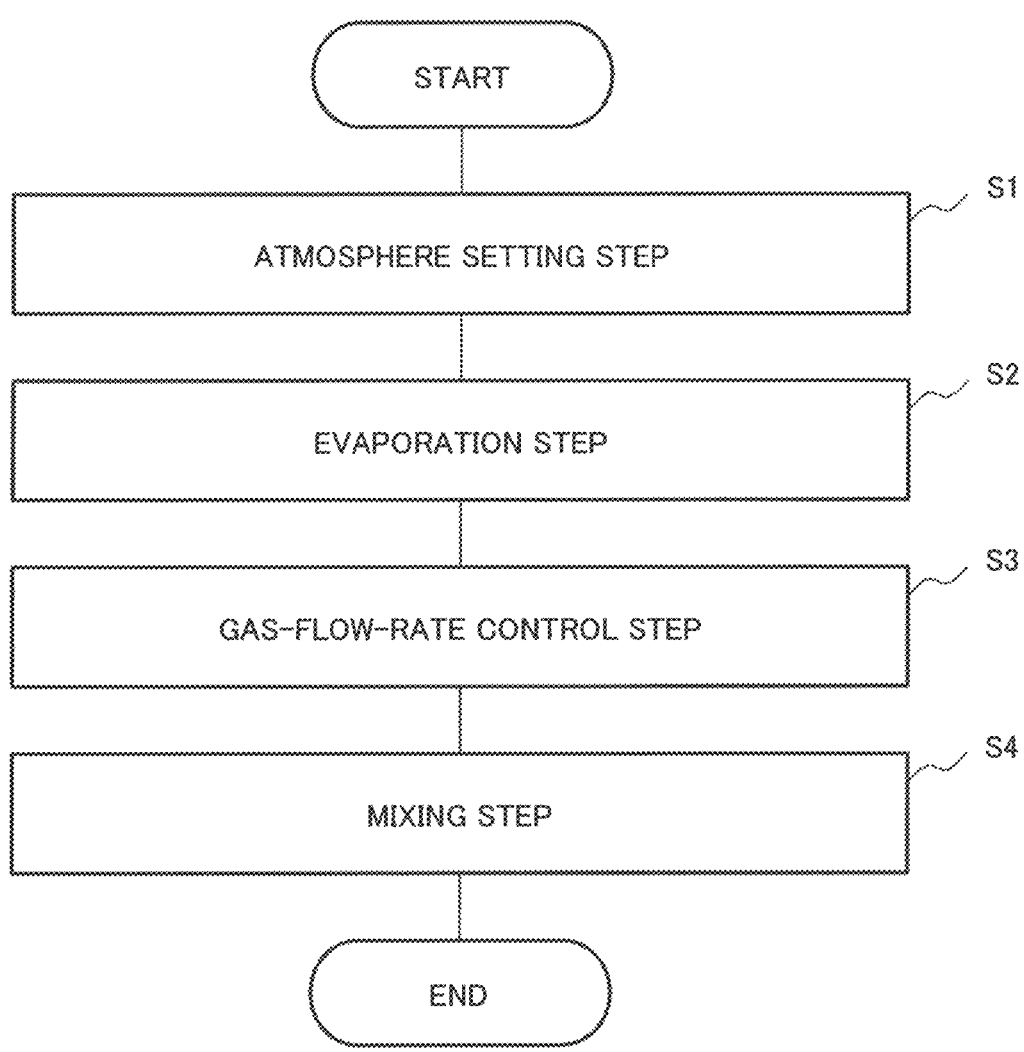
FIG. 2 is a diagram illustrating a manufacturing flow for the nanocarbon composite material in the example embodiment of the present invention.

A method for manufacturing the nanocarbon composite material 100 will be described next. FIG. 2 is a diagram illustrating a flow of manufacturing of the nanocarbon composite material 100.

As illustrated in FIG. 2, first, as an atmosphere setting step (S1), an inert gas, nitrogen gas, hydrogen, carbon monoxide gas, or mixture atmosphere is set in a chamber in which a catalyst-containing carbon target is placed.

Then, as an evaporation step (S2), the catalyst-containing carbon target is evaporated by laser ablation while rotating the catalyst-containing carbon target.

Specifically, carbon containing a catalyst is used as a target, the target is heated by laser ablation in a nitrogen atmosphere, an inert atmosphere, or a mixture atmosphere while rotating the target, thereby evaporating the target. Fibrous carbon nanohorn aggregates 11 and spherical carbon nanohorn aggregates 12 can be obtained in the process of the evaporated carbon and catalyst being cooled.

Note that a method of using a carbon target containing a catalyst has been known to some as a method for manufacturing carbon nanotubes. However, pure (100%) graphite targets containing no catalyst have been used heretofore in manufacturing of carbon nanohorn aggregates (spherical carbon nanohorn aggregates).

In the laser ablation (LA) method used in step S2, the target is irradiated with laser in a pulsed manner or continuously. When the intensity of the irradiation increases above a threshold, the target converts energy. As a result, a plume is generated and primarily deposits products on a substrate placed downstream from the target. Note that the products may be generated in a space inside an apparatus and may be collected in a collecting chamber.

For the laser ablation, a $CO_2$ laser, an yttrium aluminum garnet (YAG) laser, or an excimer laser can be used. Using the $CO_2$ laser, which can easily output high power, is most suitable.

The $CO_2$ laser can be used with an output power of 1 $kW/cm^2$ to 1000 $kW/cm^2$ and laser ablation can be performed with continuous irradiation and pulsed irradiation.

Continuous irradiation is desirable for generation of carbon nanohorn aggregates. Laser light is focused by using a ZnSe lens or the like to apply irradiation. Further, by rotating the target, fibrous carbon nanohorn aggregates 11 and spherical carbon nanohorn aggregates 12 can be continuously synthesized. While any target rotation rate can be set, a rotation rate of 0.1 to 6 rpm is especially preferable. On the other hand, a target rotation rate slower than 0.1 rpm is not preferable because the target is likely to be graphitized. A target rotation rate faster than 6 rpm is not preferable because amorphous carbon increases.

In this case, the laser output is preferably equal to or greater than 15 $kW/cm^2$ and 30 to 300 $kW/cm^2$ is most effective. When laser output is smaller than 15 $kW/cm^2$, the target is not evaporated, which makes it difficult to synthesize fibrous carbon nanohorn aggregates 11 and spherical carbon nanohorn aggregates 12.

Further, even when laser output is greater than 300 $kW/cm^2$, the fibrous carbon nanohorn aggregates 11 and spherical carbon nanohorn aggregates 12 can be synthesized, but the proportion of amorphous carbon increases, therefore it is not appropriate.

Pressure in the chamber equal to or less than 13332.2 hPa (10000 Torr) can be used. However, as pressure approaches a vacuum, it becomes more likely to generate carbon nanotubes and less likely to obtain carbon nanohorn aggregates.

Therefore, using a pressure of preferably 666.61 hPa (500 Torr) to 1266.56 hPa (950 Torr), more preferably close to ordinary pressure (1013 hPa (1 atm≈760 Torr)) is appropriate for quantity synthesis and cost reduction.

An irradiation area can be controlled by laser output and a degree of light focusing with a lens. For example, the irradiation area may be set to 0.01 $cm^2$ to 1 $cm^2$.

As the catalyst, Fe, Ni, or Co may be used singularly or in mixture. While any concentration of the catalyst may be chosen as appropriate, a concentration of 0.1 mass % to 10 mass % with respect to carbon is preferable and a concentration of 0.5 mass % to 5 mass % with respect to carbon is more preferable. When a concentration of catalyst is less than 0.1 mass %, only spherical carbon nanohorn aggregates can be obtained primarily, and therefore it is undesirable. Further, when a concentration of catalyst is greater than 10 mass %, the cost of the target increases, and therefore it is not preferable. Part of a carbon skeleton of fibrous carbon nanohorns and carbon nanohorn aggregates may be replaced with a catalyst metal element or the like.

Temperature in the chamber may be chosen arbitrarily. The temperature in the chamber is set preferably at 0 to 100° C. Furthermore preferably, the temperature in the chamber is set at room temperature. Setting the temperature in the chamber at room temperature is appropriate for quantity synthesis and cost reduction.

Nitrogen gas, inert gas, oxygen, carbon monoxide or the like is introduced singularly or in mixture into the chamber to provide an atmosphere described above. These gases circulate inside the chamber. Accordingly, a substance to be generated can be collected by using the flow of gas. In the case where the atmosphere is nitrogen gas, part of a carbon skeleton of fibrous carbon nanohorns and carbon nanohorn aggregates may be replaced with nitrogen atoms or the like.

Further, a closed atmosphere may be used depending on introduced gas. While any atmosphere gas flow rate may be used, an atmosphere gas flow rate preferably in the range of 0.5 L/min to 100 L/min is appropriate as an atmosphere gas flow rate.

As a gas flow rate control step (S3), the gas flow rate is controlled to be constant in the process of evaporation of the catalyst-containing carbon target. Specifically, in the process of evaporation of the target, the gas flow rate is controlled to be constant. The gas flow rate can be kept constant by matching a feed gas flow rate and an exhaust gas flow rate. When the gas flow rate control step (S3) is performed at or near ordinary pressure, the gas flow rate can be controlled to be constant by extruding and exhausting gas inside the chamber by feed gas.

Lastly, as a mixing step (S4), carbon nanohorn aggregates obtained through the process including the atmosphere setting step (S1), the evaporation step (S2) and the gas-flow-rate control step (S3) are mixed into a matrix. Note that the carbon nanohorn aggregates in the mixing step (S4) may include at least fibrous carbon nanohorn aggregates 11. More preferably, the carbon nanohorn aggregates in the mixing step (S4) include fibrous carbon nanohorn aggregates 11 and spherical carbon nanohorn aggregates 12.

A method for manufacturing the nano carbon composite material 100 has been described above.

EXAMPLES

Examples will be given below and the present invention will be illustratively described in further detail. Note that the examples given below do not limit the present invention.

Example 1

Fibrous carbon nanohorn aggregates 11 and spherical carbon nanohorn aggregates 12 were produced as a sample 1 by $CO_2$ laser ablation of a carbon target containing 1 mass % of iron in a nitrogen atmosphere.

Details of experimental conditions are as follows. The carbon target that contains 1 mass % of iron was rotated at 2 rpm. The target was continuously irradiated with $CO_2$ laser with an energy density of 80 $kW/cm^2$ and the temperature in the chamber was set at room temperature. The gas flow rate in the chamber was adjusted to be 10 L/min. The pressure was controlled to be 933.254 to 1266.559 hPa (700 to 950 Torr).

Example 2

Figure 3:
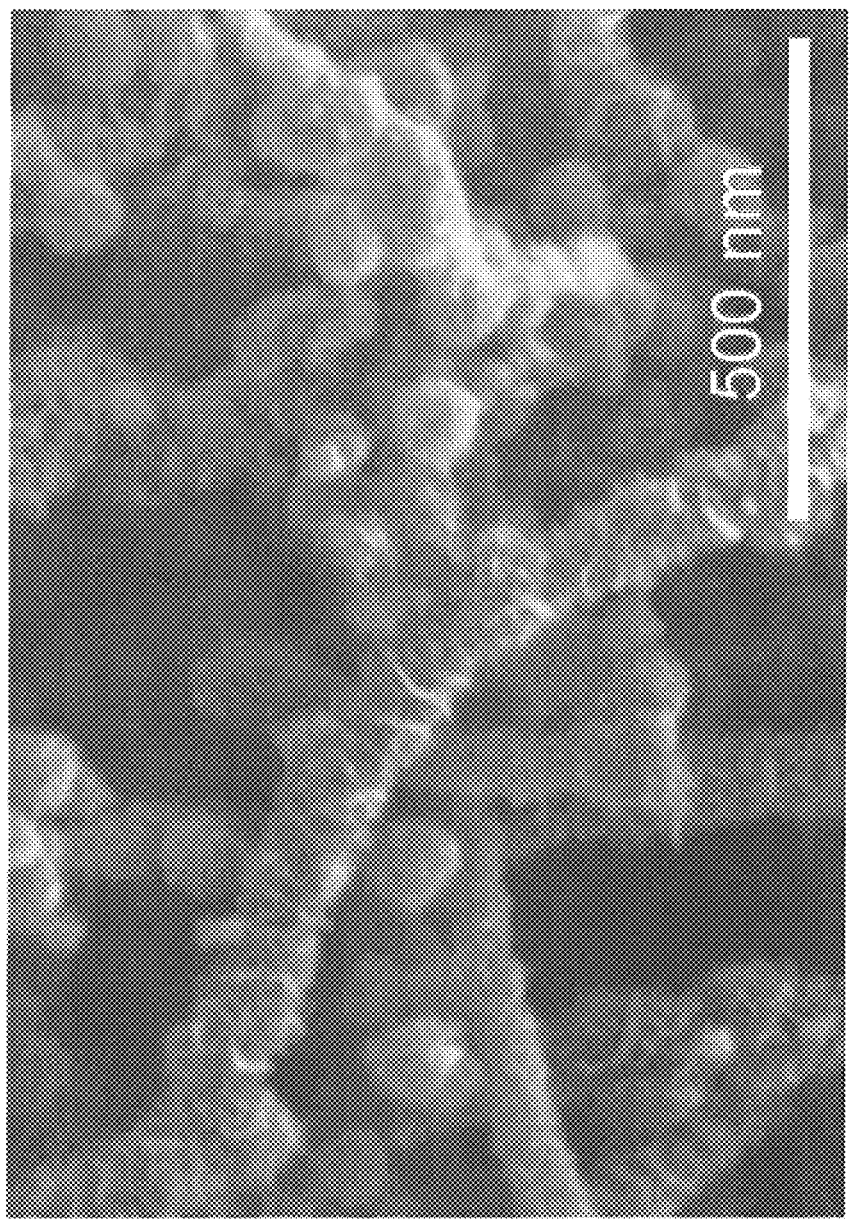
FIG. 3 is a scanning electron micrograph of fibrous carbon nanohorn aggregates and spherical carbon nanohorn aggregates produced according to the present invention.

FIG. 3 is a scanning electron micrograph of fibrous carbon nanohorn aggregates 11 and spherical carbon nanohorn aggregates 12 produced according to the present invention and is a scanning electron micrograph of the sample 1.

As illustrated in FIG. 3, fibrous and spherical substances can be observed. The fibrous substances are approximately 30 to 100 nm in diameter and approximately several μm to several ten μm in length. Most of the spherical substances are in the range of approximately 30 to 200 nm in diameter and have a substantially uniform size.

Figure 4:
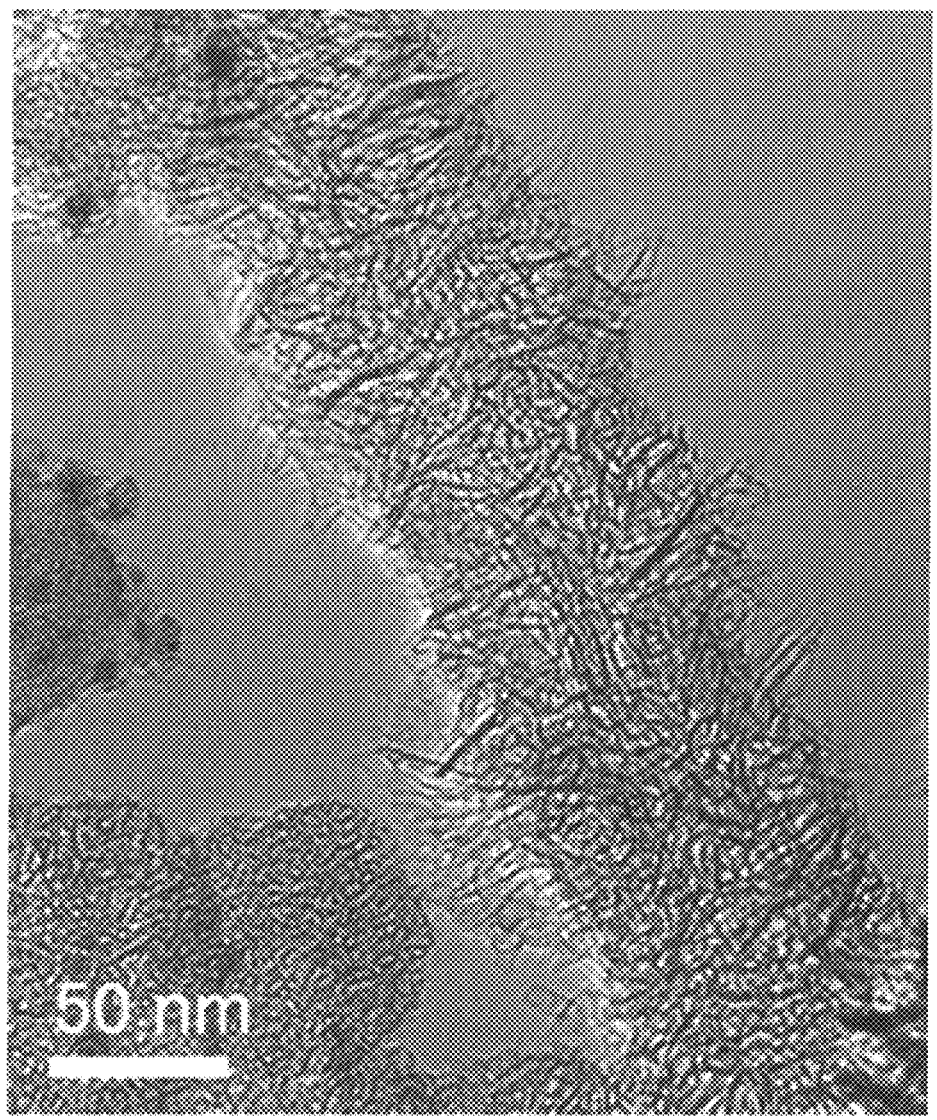
FIG. 4 is a transmission electron micrograph of a fibrous carbon nanohorn aggregate produced according to the present invention.
Figure 5:
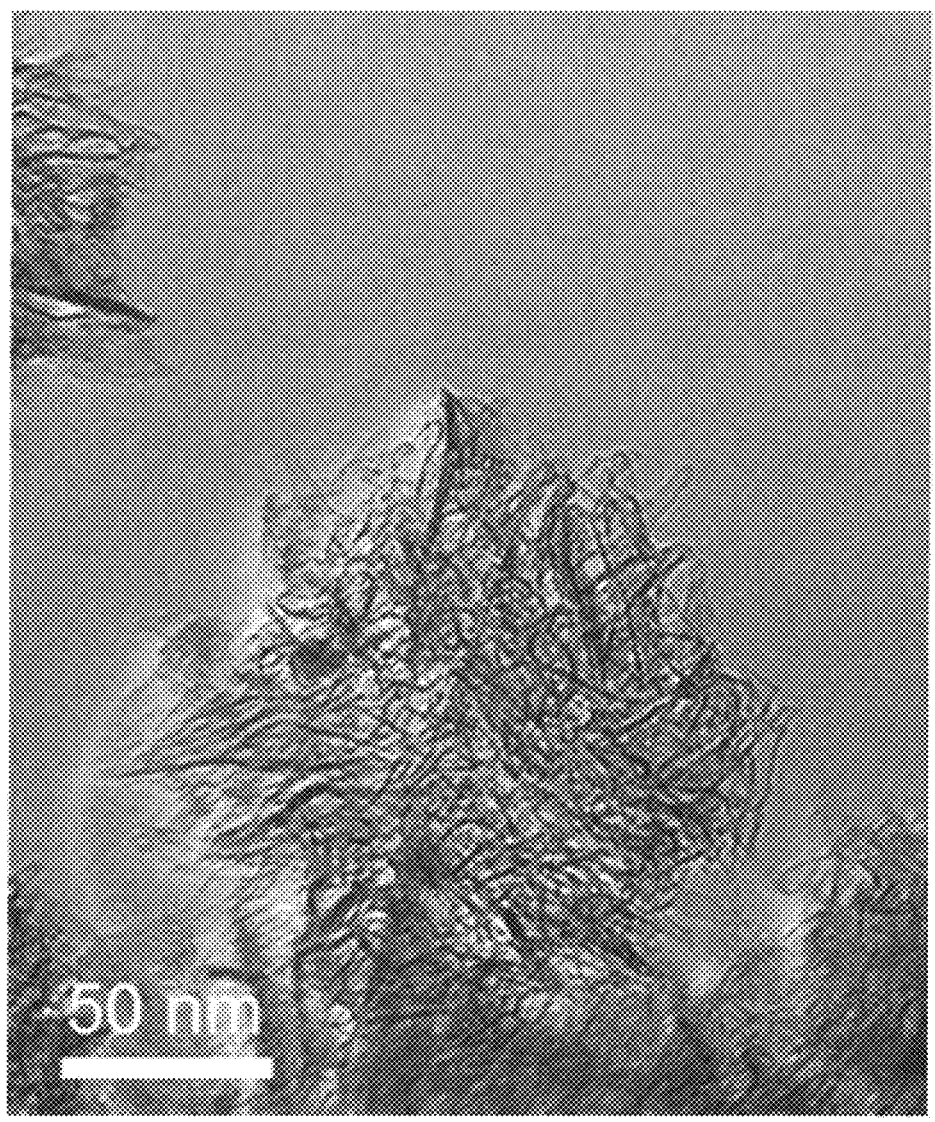
FIG. 5 is a transmission electron micrograph of a spherical carbon nanohorn aggregate produced according to the present invention.

FIG. 4 is a transmission electron micrograph of a fibrous carbon nanohorn aggregate 11 produced according to the present invention. FIG. 5 is a transmission electron micrograph of a spherical carbon nanohorn aggregate 12 produced according to the present invention. In other words, FIGS. 4 and 5 are transmission electron micrographs of products contained in the sample 1.

It was found from observation result of FIG. 4 that a fibrous substance was fibrously assembled single-walled carbon nanohorns each of which was approximately 1 to 5 nm in diameter and approximately 40 to 50 nm in length. It was also found from observation result of FIG. 5 that a spherical substance was a spherical carbon nanohorn aggregate 12. Further, it was found from analysis using energy dispersive X-ray spectroscopy (EDX) that black particles were primarily iron.

Example 3

The sample 1 produced in the example 1 was adjusted in such a way that the proportion of the sample 1 in a polycarbonate resin was 10% of the entire material to produce a composite material 1A. The polycarbonate resin used was bisphenol A type polycarbonate.

For the purpose of comparison, a composite material containing fibrous carbon nanohorn aggregates 11 alone (referred to as a composite material 2A), a composite material containing spherical carbon nanohorn aggregates 12 alone (referred to as a composite material 3A) and a composite material containing carbon black alone (referred to as a composite material 4A) were produced.

FIG. 6 is a diagram illustrating electrical conductivity and tensile strength of the nanocarbon composite material (composite material 1A) in the example embodiment of the present invention and the comparative examples (composite material 2A, composite material 3A and composite material 4A). The electrical conductivity is represented by resistivity and the smaller the value ($\Omega \cdot cm$) is, the better the electrical conductivity is. The greater the value (MPa) of tensile strength is, the better the tensile strength is.

As shown in FIG. 6, the composite material 1A is totally superior in electrical conductivity and tensile strength to composite materials 2A, 3A and 4A. In other words, it is found that electrical conductivity and tensile strength are significantly improved by using both of fibrous carbon nanohorn aggregates 11 and spherical carbon nanohorn aggregates 12, as compared with commonly used carbon black and the like. Further, both of the fibrous structure (composite material 2A) and the spherical structure (composite material 3A) are superior in both of electrical conductivity and tensile strength to the carbon black structure (composite material 4A). Moreover, the fibrous structure (composite material 2A) is superior in property, in particular, in tensile strength, to the spherical structure (composite material 3A).

Example 4

The sample 1 produced in the example 1 was dispersed in methyl isobutyl ketone (MIBK) by using ultrasonic waves, was mixed in a fluoro-rubber solution, and was dried to obtain a composite material (referred to as a composite material 1B).

Adjustment was made in such a way that the proportion of a carbon material was 10% of the entire composite material. For the purpose of comparison, a composite material containing fibrous carbon nanohorn aggregates 11 alone (referred to as a composite material 2B), a composite material containing spherical carbon nanohorn aggregates 12 alone (referred to as a composite material 3B), and a composite material containing carbon black alone (referred to as a composite material 4B) were produced.

FIG. 7 is a diagram illustrating electrical conductivity and tensile strength of the nanocarbon composite material (composite material 1B) in the example embodiment of the present invention and the comparative examples (composite material 2B, composite material 3B and composite material 4B).

As illustrated in FIG. 7, the composite material 1B is totally superior in electrical conductivity and tensile strength to the composite materials 2B, 3B and 4B. In other words, it is found that electrical conductivity and tensile strength are significantly improved by using both of fibrous carbon nanohorn aggregates 11 and spherical carbon nanohorn aggregates 12, as compared with commonly used carbon black and the like. Further, both of the fibrous structure (composite material 2B) and the spherical structure (composite material 3B) are superior in both of electrical conductivity and tensile strength to the carbon black structure (composite material 4B). Moreover, the fibrous structure (composite material 2B) is superior in property, in particular, in tensile strength, to the spherical structure (composite material 3B).

Example 5

The sample 1 produced in the example 1 and electrically conductive particles which are silver particles were mixed together by using a triple roll mill to produce a conductive paste (referred to as a paste 1C). In this case, adjustment was made so that the paste contained 95% silver particles, 4% epoxy resin and 1% the sample 1. The paste 1C was hardened at 150° C. and then its electrical conductivity was evaluated.

For the purpose of comparison, a paste containing fibrous carbon nanohorn aggregates 11 alone (referred to as a paste 2C), a paste containing spherical carbon nanohorn aggregates 12 alone (referred to as a paste 3C), and a paste containing carbon black alone (referred to as a paste 4C) were produced, instead of the sample 1.

FIG. 8 is a diagram illustrating electrical conductivity of the conductive paste made of the nanocarbon composite material (sample 1) in the example embodiment of the present invention and the comparative examples (paste 2C, paste 3C and paste 4C). While not illustrated in FIG. 8, a silver paste that does not contain a carbon material was also produced. The electrical conductivity of the silver paste was $9.0 \times 10^{-5} \, \Omega \cdot cm$.

As illustrated in FIG. 8, the electrical conductivity of the paste 1C is totally superior to the pastes 2C, 3C and 4C. In other words, it is found that electrical conductivity is significantly improved by using both of fibrous carbon nanohorn aggregates 11 and spherical carbon nanohorn aggregates 12, as compared with commonly used carbon black and the like. Further, both of the fibrous structure (paste 2C) and the spherical structure (paste 3C) are superior in electrical conductivity to the carbon black structure (paste 4C).

Example 6

The sample 1 produced in the example 1 was mixed with Al powder, which is a matrix, in such a way that the proportion of the sample 1 was 20% of the whole. The obtained sample was sintered under conditions with 560° C. to produce a composite material 1D. In doing so, a pressure of 30 MPa was applied.

For the purpose of comparison, a composite material containing fibrous carbon nanohorn aggregates 11 alone (referred to as a composite material 2D), a composite material containing spherical carbon nanohorn aggregates 12 alone (referred to as a composite material 3D), and a composite material containing carbon black alone (referred to as a composite material 4D) were produced, instead of the sample 1.

FIG. 9 is a diagram illustrating thermal conductivity of the nanocarbon composite material (composite material 1D) in the example embodiment of the present invention and the comparative examples (composite material 2D, composite material 3D and composite material 4D).

Note that the thermal conductivity of a sintered body containing aluminum alone produced under the same conditions was 200 W/mK. Thus, any of the composite materials 1D to 4D were improved in thermal conductivity as compared to the sintered body containing aluminum alone.

As illustrated in FIG. 9, the composite material 1D is superior in thermal conductivity to the composite materials 2D, 3D and 4D. In other words, it is found that thermal conductivity is significantly improved by using both of fibrous carbon nanohorn aggregates 11 and spherical carbon nanohorn aggregates 12, as compared with commonly used carbon black and the like. Further, both of the fibrous structure (composite material 2D) and the spherical structure (composite material 3D) are superior in thermal conductivity to the carbon black structure (composite material 4D). Moreover, the fibrous structure (composite material 2D) is superior in thermal conductivity to the spherical structure (composite material 3D).

Example 7

Fibrous carbon nanohorn aggregates and spherical carbon nanohorn aggregates were produced in a way similar to the sample 1 in the example 1 was produced, except that a carbon target containing 5 mass % of iron was used. When a product obtained was observed by using transmission electron microscope (TEM) observation and scanning electron microscope (SEM) observation, it could be confirmed that both of fibrous carbon nanohorn aggregates and spherical carbon nanohorn aggregates were produced. Both of carbon nanohorn aggregates included seed-type, bud-type, dahlia-type and petal-dahlia-type aggregates. The proportion of the fibrous and spherical structures was slightly greater than that in the sample 1 in the example 1.

Example 8

Fibrous carbon nanohorn aggregates and spherical carbon nanohorn aggregates were produced by $CO_2$ laser ablation of a carbon target containing 5 mass % of iron in a nitrogen atmosphere. In doing so, the target was rotated at 2 rpm. The target was continuously irradiated with $CO_2$ laser with an energy density of 150 kW/cm$^2$ and the chamber temperature was room temperature. The flow rate of gas in the chamber was adjusted to be 10 L/min. The pressure was controlled to be 933.254 to 1266.559 hPa (700 to 950 Torr). When a product obtained was observed by TEM observation and SEM observation, it could be confirmed that both of fibrous carbon nanohorn aggregates and spherical carbon nanohorn aggregates were produced. Both of carbon nanohorn aggregates included seed-type, bud-type, dahlia-type and petal-dahlia-type aggregates and the dahlia-type and petal-dahlia-type were more than the other types. The proportion of the fibrous and spherical structures was slightly greater than that in the sample 1 in the example 1.

As has been described above, in the nanocarbon composite material 100 according to the example embodiment of the present invention, a fibrous carbon nanohorn aggregate 11 of a plurality of single-walled carbon nanohorns connected fibrously is dispersively formed in a matrix 13.

In the fibrous carbon nanohorn aggregate 11, a plurality of single-walled carbon nanohorns are connected fibrously in a one-dimensional direction while being radially assembled with ends pointing outward. Thus, the fibrous carbon nanohorn aggregate 11 forms a better conductive path than existing spherical carbon nanohorn aggregates and has superior electrical conductivity. Further, the fibrous carbon nanohorn aggregate 11 has higher dispersibility than ordinary carbon materials that have a needle-like structure. Accordingly, the fibrous carbon nanohorn aggregates 11 are dispersed in a high proportion (highly dispersed) in the matrix 13 and thus a nanocarbon composite material that is superior in providing electrical conductivity can be provided. Further, since fibrous carbon nanohorn aggregates are dispersed in the matrix to form a conductive path, thermal conductivity is also improved. Moreover, when fibrous carbon nanohorn aggregates stick to each other, the fibrous carbon nanohorn aggregates have many contacts with each other, thus providing superior mechanical strength. Therefore, according to the nanocarbon composite material in the present example embodiment, the fibrous carbon nanohorn aggregates 11 are dispersed in the matrix 13, thereby enabling to obtain a nanocarbon composite material that is superior in providing thermal conductivity and mechanical strength in addition to providing electrical conductivity.

Further, in the nanocarbon composite material 100 in the example embodiment of the present invention, spherical single-walled carbon nanohorn aggregates 12 are further formed dispersively in a matrix 13 in addition to fibrous carbon nanohorn aggregates 11.

The spherical carbon nanohorn aggregates 12 are highly dispersed in the matrix 13 and are uniformly mixed with the fibrous carbon nanohorn aggregates 11, which have a large aspect ratio, and the matrix 13, thereby preventing recohesion. Further, the spherical carbon nanohorn aggregates 12 and the fibrous carbon nanohorn aggregates 11, which are highly dispersive, do not cohere in the matrix but stick to each other. Accordingly, conductive paths of electrons in the nanocarbon composite material 100 increase. Thus, a nanocarbon composite material that is superior in providing electrical conductivity can be obtained. Further, an end of each of the single-walled carbon nanohorns of the fibrous carbon nanohorn aggregates 11 and the spherical carbon nanohorn aggregates 12 points outward. Accordingly, the fibrous carbon nanohorn aggregates 11 and the spherical carbon nanohorn aggregates 12 have many contacts with each other and therefore have high adhesiveness. This effect produces good electrical conductivity and thermal conductivity and increases resistance to structural transformation and durability. Thus, a nanocarbon composite material that is superior in providing thermal conductivity and mechanical strength in addition to providing electrical conductivity can be obtained.

Further, in the nanocarbon composite material 100 in the example embodiment of the present invention, a matrix 13 is made of any one or more of a metal, an oxide, a conductive polymer compound, a resin and an elastomer. Fibrous carbon nanohorn aggregates 11 and spherical carbon nanohorn aggregates 12, which are highly dispersive, have a high affinity for the matrix 13 and can be made into a composite. Therefore, a material of the matrix 13 can be chosen as appropriate according to physical properties, such as electrical conductivity, durability, elasticity, mechanical strength, electromagnetic shielding, and flame resistance, which are required of the nanocarbon composite material 100.

Preferably, each fibrous carbon nanohorn aggregate 11 in the nanocarbon composite material 100 in the example embodiment of the present invention have a diameter of 30 nm to 200 nm and a length of 1 μm to 100 μm.

Preferably, each of the single-walled carbon nanohorns in the nanocarbon composite material 100 in the example embodiment of the present invention has a diameter of 1 nm to 5 nm and a length of 30 nm to 100 nm and has a horn-shaped end.

Further, in the nanocarbon composite material 100 in the example embodiment of the present invention, the fibrous carbon nanohorn aggregates 11 include at least one type of carbon nanohorn aggregate structure among seed-type, bud-type, dahlia-type, petal-dahlia-type, and petal-type.

Further, in the nanocarbon composite material 100 in the example embodiment of the present invention, spherical carbon nanohorn aggregates 12 include at least one type of carbon nanohorn aggregate structure among seed-type, bud-type, dahlia-type, petal-dahlia type and petal-type.

Preferably, a catalyst metal is introduced inside of the fibrous carbon nanohorn aggregates 11 in a nanocarbon composite material 100 in an example embodiment of the present invention. Alternatively, primarily a catalyst metal is introduced inside of spherical carbon nanohorn aggregates 12.

Further, a method for manufacturing a nanocarbon composite material 100 in the example embodiment of the present invention includes an atmosphere setting step, an evaporation step, a gas-flow-rate control step, and a mixing step. In the atmosphere setting step, an inert gas, nitrogen gas, or mixture atmosphere is set in a chamber in which a catalyst-containing carbon target is placed. In the evaporation step, the catalyst-containing carbon target is evaporated by laser ablation while rotating the catalyst-containing carbon target. In the gas-flow-rate control step, the gas flow rate is controlled to be constant in the process of evaporation of the catalyst-containing carbon target. In the mixing step, fibrous carbon nanohorn aggregates 11 obtained through the process including the atmosphere stetting step, the evaporation step and the gas-flow-rate control step are mixed into a matrix 13. Each of the fibrous carbon nanohorn aggregates 11 includes a plurality of single-walled carbon nanohorns assembled fibrously.

Even the method for manufacturing such a nanocarbon composite material 100 can achieve the same advantageous effects as the carbon composite material 100 described above.

Further, in a mixing step in the method for manufacturing a nanocarbon composite material 100 in the example embodiment of the present invention, spherical single-walled carbon nanohorn aggregates 12 which can be obtained through a process including an atmosphere setting step, an evaporation step and a gas-flow-rate control step at the same time are mixed into a matrix 13, in addition to fibrous carbon nanohorn aggregates 11. Even the method for manufacturing such a nanocarbon composite material 100 can achieve the same advantageous effects as the nanocarbon composite material 100 described above.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-124654 filed on Jun. 22, 2015, the entire disclosure of which is incorporated herein.

REFERENCE SIGNS LIST

11 Fibrous carbon nanohorn aggregate
12 Spherical carbon nanohorn aggregate
13 Matrix
100 Nanocarbon composite material

The invention claimed is:

1. A nanocarbon composite material in which a fibrous carbon nanohorn aggregate of a plurality of single-walled carbon nanohorn aggregates connected fibrously in a one-dimensional direction while being radially assembled with an end pointing outward is dispersively formed in a matrix.

2. The nanocarbon composite material according to claim 1, wherein
    a spherical single-walled carbon nanohorn aggregate is further dispersively formed in the matrix, in addition to the fibrous carbon nanohorn aggregate.

3. The nanocarbon composite material according to claim 1, wherein
    the matrix is made of any one or more of a metal, an oxide, a conductive polymer compound, a resin, and an elastomer.

4. The nanocarbon composite material according to claim 1, wherein
    the fibrous carbon nanohorn aggregate is 30 nm to 200 nm in diameter and 1 μm to 100 μm in length.

5. The nanocarbon composite material according to claim 1, wherein
    the single-walled carbon nanohorn is 1 nm to 5 nm in diameter and 30 nm to 100 nm in length and has a horn-shaped end.

6. The nanocarbon composite material according to claim 1, wherein
    the fibrous carbon nanohorn aggregate is an aggregate of fibrously connected carbon nanohorn aggregates of at least one shape type among a seed shape, a bud shape, a dahlia shape, a petal-dahlia shape, and a petal shape.

7. The nanocarbon composite material according to claim 2, wherein
    the spherical carbon nanohorn aggregate includes a carbon nanohorn aggregate of at least one shape type among a seed shape, a bud shape, a dahlia shape, a petal-dahlia shape, and a petal shape.

8. The nanocarbon composite material according to claim 1, wherein
    a catalyst metal is introduced inside of the fibrous carbon nanohorn aggregate or the spherical carbon nanohorn aggregate.

9. A method for manufacturing a nanocarbon composite material, the method comprising:
    setting an inert gas atmosphere, a nitrogen gas atmosphere, or a mixture atmosphere in a chamber in which a catalyst-containing carbon target is placed;
    evaporating the catalyst-containing carbon target by laser ablation while rotating the catalyst-containing carbon target;
    controlling a gas flow rate to be constant in a process of evaporation of the catalyst-containing carbon target; and mixing, into a matrix, a fibrous carbon nanohorn aggregate of a plurality of single-walled carbon nanohorns connected fibrously in a one-dimensional direction while being radially assembled with an end pointing outward, the fibrous carbon nanohorn aggregate being obtained through a process including the setting, the evaporating, and the controlling.

10. The method for manufacturing a nanocarbon composite material, according to claim 9, wherein
a spherical single-walled carbon nanohorn aggregate is mixed into a matrix in addition to the fibrous carbon nanohorn aggregate.

* * * * *

UNITED STATES PATENT AND TRADEMARK OFFICE
CERTIFICATE OF CORRECTION

PATENT NO.        : 10,703,633 B2
APPLICATION NO.   : 15/738835
DATED             : July 7, 2020
INVENTOR(S)       : Ryota Yuge It is certified that error appears in the above-identified patent and that said Letters Patent is hereby corrected as shown below:

In the Specification

Column 6, Description of Embodiments, Line 9; Delete "100 μnm." and insert --100 μm.-- therefor Signed and Sealed this
Twenty-fourth Day of November, 2020

Andrei Iancu
*Director of the United States Patent and Trademark Office*